US012286838B1

(12) United States Patent
Martinez Cuervo

(10) Patent No.: US 12,286,838 B1
(45) Date of Patent: Apr. 29, 2025

(54) DRIVE ASSEMBLY FOR A VERTICAL BLIND

(71) Applicant: Marcelo Martinez Cuervo, Miami, FL (US)

(72) Inventor: Marcelo Martinez Cuervo, Miami, FL (US)

(*) Notice: Subject to any disclaimer, the term of this patent is extended or adjusted under 35 U.S.C. 154(b) by 388 days.

(21) Appl. No.: 17/877,641

(22) Filed: Jul. 29, 2022

(51) Int. Cl.
*E06B 9/68* (2006.01)
*E06B 9/42* (2006.01)
*E06B 9/78* (2006.01)
*E06B 9/40* (2006.01)

(52) U.S. Cl.
CPC .................. *E06B 9/68* (2013.01); *E06B 9/42* (2013.01); *E06B 9/78* (2013.01); *E06B 2009/405* (2013.01); *E06B 2009/785* (2013.01)

(58) Field of Classification Search
CPC ..... E06B 9/68; E06B 9/42; E06B 9/78; E06B 2009/405; E06B 2009/785; E06B 9/74; E06B 2009/425
See application file for complete search history.

(56) References Cited

U.S. PATENT DOCUMENTS 1,562,764 A 11/1925 Harris
4,418,739 A * 12/1983 Woolnough .............. E06B 9/68 160/120
4,953,610 A 9/1990 Phillips et al.
5,205,334 A 4/1993 Judkins
6,176,290 B1 * 1/2001 Hsu ......................... E06B 9/322 160/115
6,648,048 B2 11/2003 Lai
6,712,115 B2 3/2004 Judkins
6,941,996 B2 9/2005 Ward et al.
6,964,291 B2 11/2005 Judkins
7,849,907 B2 * 12/2010 Jang .......................... E06B 9/40 160/89
7,931,066 B2 4/2011 Honda et al.
8,025,088 B2 * 9/2011 Kim .......................... E06B 9/40 160/125
8,146,646 B1 * 4/2012 Toder ........................ E06B 9/64 160/310
8,726,969 B2 5/2014 Lin
9,890,583 B2 * 2/2018 Marocco ................... E06B 9/50
11,142,947 B1 * 10/2021 Zhang ....................... E06B 9/78
2006/0027336 A1 2/2006 Lin
2006/0151126 A1 7/2006 Lampe
2014/0048219 A1 * 2/2014 Knowles .............. A47H 5/0325 160/331
2022/0106832 A1 * 4/2022 Zhou ......................... E06B 9/42

* cited by examiner

*Primary Examiner* — Beth A Stephan
(74) *Attorney, Agent, or Firm* — MALLOY & MALLOY PL

(57) ABSTRACT

A drive assembly structured to selectively rotate different ones of a plurality of blind rollers of a vertical blind assembly including a drive component, selectively positioned into driving relation with different ones of the plurality of blind rollers. The drive gear includes a driving component disposable into rotationally driving engagement with a different one of the plurality of blind rollers, concurrent to rotation of said drive gear. A support assembly is movable with and rotationally supports the drive gear when in the driving relation to an aligned one of the plurality of blind rollers. A selector assembly is drivingly connected to the support assembly and is operative to selectively dispose support assembly and drive gear into driving relation with the different ones of the plurality of blind rollers.

18 Claims, 6 Drawing Sheets

DRIVE ASSEMBLY FOR A VERTICAL BLIND

BACKGROUND OF THE INVENTION

Field of the Invention

The present invention is directed to a drive assembly for a vertical blind assembly comprising a plurality of blind rollers each having a blind rotationally mounted thereon. The drive assembly is operationally structured to selectively and independently raise and lower the blinds on different ones of the plurality of blind rollers.

DESCRIPTION OF THE RELATED ART

In both residential and commercial environments different window covering systems have been developed. By way of example, one such blind or shade system includes roller shades. As conventionally structured and utilized a roller shade includes at least one roller having a decorative flexible material panel/shade/blind rotationally supported thereon. Upon activation, the roller is selectively rotated in either of two opposite directions thereby causing the decorative shade to be raised or lowered, dependent on the direction of rotation of the roller.

It is also recognized in the window treatment industry that it is often desirable to provide different distinct window coverings over a given window or like portal. This frequently facilitates the control of light entering through the window and/or the establishment of a certain degree of privacy by preventing viewing through the window.

In the past several years a growth in different types of window covering structures and materials have been developed which were available to purchasers. Such increased growth has included the popularity of double shades or shade and/or blind assemblies having a plurality of shades. By way of example, one window covering associated with a window shade system may be provided and structured to be at least partially translucent thereby enabling a predetermined degree or amount of light to pass therethrough. In contrast, one or more additional shades may be formed of an at least partially opaque material to restrict the passage of light through the corresponding window. Further, known multi-panel or multi-shade blind or shade systems may combine a plurality of shade or blind panels having an even greater variance in the structural features thereof in order to increase the decorative appearance of the window covering.

However, there are recognized disadvantages and limitations associated with multi-shade systems including complex and/or multiple hardware components which are intended to facilitate the raising and lowering of individual ones the multiple decorative shade panels. This in turn adds complexity to the installation and cost of the initial purchase of such known or conventional systems. In addition, multiple operating pull cords, or like manually operative actuators are frequently required in order to control or activate the individual multiple decorative panels. Also, there may be potentially increased safety concerns associated with multiple operating or activating structures such as the aforementioned pull cords, wands, etc. in that such devices have been recognized as a potential safety hazard.

In order to overcome noted disadvantages and problems of the type set forth herein, there is a recognized need for a window treatment system in the form of a blind or shade assembly which May include a plurality of shades each mounted on a different roller, and which are independently operable so as to be selectively activated in terms of being raised or lowered. Further, such an improved and proposed system should be of generally compact construction requiring which can be easily installed and have a cost factor of material and construction appropriate for low-cost purchase by the consuming public. Further, such a preferred and proposed vertical blind or shade assembly could be of the “roller shade” category wherein a plurality of shades or blinds are included in the same assembly and/or system. In addition, independent and selective activation and control of each of the plurality of shades or blinds would preferably be accomplished using a single control structure such as a single pull cord or chain.

Finally, a proposed and improved blind or shade assembly should include a long operable life due in part to the simplicity of the structural and operative components associated there with.

SUMMARY OF THE INVENTION

The present invention is directed to a drive assembly operatively associated with a vertical blind assembly of the type having multiple blinds or shades which may be independently and or collectively disposed into a raised, stored position on corresponding ones of a plurality of blind rollers, in a lowered, window covering position or between the raised and lowered positions.

As will become more evident hereinafter, each of the multiple blinds or shades referred to herein are preferably, but not necessarily, of the type commonly referred to as roller shades or blinds, formed of a flexible material panel. The shade or blind panel may include decorative features and capable of being removably rolled upon itself and the supporting blind or shade roller, such as when in the raised, stored position.

Further, the drive assembly of the present invention includes a drive gear cooperatively structured with the remaining components of the drive assembly to be selectively positioned in driving relation with each of the plurality of blind rollers, independently of others of the plurality of blind rollers. Such selective and independent positioning of the drive gear is facilitated by the inclusion of a support assembly movable with and connected in supporting relation to the drive gear, as the drive gear moves between the plurality of blind rollers into the aforementioned driving relation with different ones of the blind rollers.

In at least one embodiment, the support assembly comprises a carriage on which the drive gear is rotationally mounted. The carriage, along with the drive gear, is movable relative to and between the plurality of blind rollers. Moreover, the operative and structural features of the carriage assembly enable a selective positioning of the drive gear in the aforementioned driving relation to each of the blind rollers independently of one another. When in the aforementioned driving relation to a selected and/or intended one of the plurality of blind rollers, the drive gear may be disposed into a driving engagement with the corresponding and/or aligned one of the blind rollers. Such a driving engagement of the drive gear with the correspondingly aligned blind roller is accomplished by exerting a rotational force and a substantially concurrent forced rotation of the drive gear.

As should be apparent, such forced or driving rotation of the drive gear will in turn cause a forced and intended rotation of the blind roller to which it is drivingly engaged. It should be of note that the drive gear, once in the aforementioned driving engagement with one of the plurality of blind rollers, may be rotated in opposite directions which in turn will cause a raising or a lowering of the blind associated with the engaged blind roller. The exertion of a rotational force and the substantially concurrent rotation of the drive gear is accomplished by interconnecting a pull chain, pull cord or like structure in rotationally driving relation to the drive gear. Therefore, exerting a pulling force in either of two opposite directions on the pull chain, pull cord etc. will result in a rotation of the drive gear and the aforementioned driving component, relative to the supporting carriage. In turn, a rotation of the drivingly engaged blind roller and a raising or lowering of the blind associated therewith will occur, dependent on the direction rotation of the drive gear.

Therefore, one embodiment of the drive assembly of the present invention is operative to distinguish disposition of the drive gear into a "driving relation" with the different ones of the blind rollers and a "driving engagement" with the different ones of the blind rollers. The driving relation of the drive gear relative to a selected one of the plurality of blind rollers is accomplished by a selected movement and positioning of the support carriage, with the drive gear mounted thereon in movable therewith, into a predetermined aligned position. The resulting predetermined aligned position of the drive gear will dispose the driving component of the drive gear, in direct communicating and aligned relation with a driven component connected to and rotational with the selected blind roller.

In contrast, the term "driving engagement" may be defined by the driving component of the drive gear disposed in direct engagement with the aforementioned driven component associated with the aligned blind roller. As indicated and explained in greater detail hereinafter, one embodiment of the drive assembly comprises the aforementioned driving component of the drive gear being disposed into "driving engagement" with a corresponding or aligned one of the blind rollers being accomplished by exerting a rotational force on and a substantially concurrent rotation of the drive gear and the included driving component.

In order to facilitate convenient, reliable and efficient operation in selecting the raising or lowering of individual ones of the blinds, via rotational activation of corresponding ones of the blind rollers, the drive assembly of the present invention further comprises a selector assembly. As utilized, the selector assembly is connected in driving relation to the aforementioned support assembly and carriage. The selector assembly is thereby operative to selectively dispose the drive gear into the driving relation, selectively with different ones of the blind rollers, through movement or travel of the carriage, with the drive gear mounted thereon.

In more specific terms, the selector assembly includes at least one selector member mounted on or connected to a frame of the vertical blind assembly or other supporting structure in a readily accessible location. As such, the selector member may be in the form of a dial, knob or other structure capable of being manually manipulated, or otherwise remotely manipulated by a power control mechanism. The selector member is thereby disposed and structured to facilitate the selection of the roller blind and blind or shade rotationally secured thereto to be raised or lowered. Further, the selector assembly includes mechanical linkage which operatively interconnects the dial or other selector member to the carriage and/or other operative components associated therewith.

Therefore, the selective manipulation of the selector member will serve to activate the aforementioned mechanical linkage, which in turn will move and/or drive the carriage, as well as the drive gear mounted thereon, into the aforementioned aligned "driving relation" to a preferred and/or selected one of the drive rollers. Once so positioned, the exertion of a rotational force on the drive gear, by the pull chain, will result in a disposition of the driving component of the drive gear into the aforementioned "driving engagement" with a driven component, fixedly attached and rotatable with a corresponding one of the blind rollers.

Further by way of example, the aforementioned drive linkage associated with the selector assembly may include a drive belt interconnecting the selector member to a driven gear which in turn may be interconnected to the carriage. It is emphasized, the term "drive belt" is meant to include different types of elongated flexible structures, preferably having a closed or continuous configuration. Accordingly, the term "drive belt" is not intended limited to be limited to a "belt" type structure, as represented in greater detail hereinafter. The operative positioning of the drive belt will result in a turning of a belt gear due to a rotation or other intended manipulation of the dial member or other type selector member. In addition, the drive linkage associated with selector assembly May also include a rack and pinion gear structure comprising a pinion gear disposed in rotationally driven relation to the aforementioned belt gear. The pinion gear is in turn disposed in driving relation to a rack gear which is fixedly secured to the carriage. In turn, a driving of the rack gear by rotation of the pinion gear will cause a linear movement or displacement of the carriage, in one of two opposite directions, as well as the drive gear mounted thereon. The drive gear as well as the driving component connected thereto will thereby be disposed in the aforementioned aligned "driving relation" to the selected one of the blind rollers. Therefore, movement of the dial or selector member to select one of the blind rollers to be activated will result in the aforementioned mechanical linkage driving and linearly positioning the carriage and the drive gear into a predetermined orientation defined by a "driving relation" of the drive gear and the driving component associated therewith relative to a selected one of the plurality of blind rollers.

Other features of the drive assembly facilitate an efficient selective and independent raising or lowering of each of the plurality of blinds through a driving rotation of corresponding ones of the plurality of blind rollers. Such features include the cooperative structuring between the aforementioned driving component, associated with the drive gear, and a plurality of driven components each fixedly secured to and rotational with different ones of the plurality of blind rollers.

More specifically, the driving component is movable with the drive gear on and relative to the supporting carriage and is also movable relative to a remainder of the drive gear, between a driving orientation and a nondriving orientation. In at least one embodiment of the drive assembly, the driving component includes a finger, stub, tongue or like structure having at least a minimal elongated and substantially mail configuration. Mechanisms, which may be at least partially integrated into the housing or body of the drive gear, are operative to dispose the driving member into and between the aforementioned driving orientation and nondriving orientation. In the nondriving orientation, the driving component may be at least partially retracted into the interior of the housing or base of the drive gear and out of driving engagement with the driven component associated with each of the plurality of blind rollers. In contrast, once the aforementioned rotational force and/or substantially concurrent rotation of the drive gear occurs, the driving component will be forced to extend outwardly from the housing, base or exposed interface of the drive gear into the driving orientation and the aforementioned "driving engagement" with a correspondingly positioned and/or aligned one of the driven components of a corresponding blind roller.

Moreover, the positioning mechanisms associated with the disposition of the driving component between the outwardly extending, driving orientation and the retracted, nondriving orientation is also operative to maintain and/or bias the driving component into the retracted, nondriving orientation after and when the exertion of a rotational force and resulting rotation of the drive gear is no longer present. Accordingly, during the retracted, nondriving orientation of the driving component, the carriage may be freely movable relative to the plurality of blind rollers and positioned into the driving relation with different ones of the blind rollers, by manipulating the dial or selector member.

As stated herein, each of the blind rollers includes a driven component fixedly connected thereto and rotational therewith. In at least one preferred embodiment, each of the driven components are secured to an end of a different one of the plurality of blind rollers. As such, each of the driven components may be positioned in substantially adjacent and communicating relation with the carriage, drive gear and driving component. In at least one embodiment, each of the driven components associated with different ones of the plurality of blind rollers has a socket and/or female-like configuration. Such socket or female configuration is dimensioned and configured to receive the substantially male configured driving component of the drive gear therein. Such disposition of the driving component within a selected one of the driven components defines the aforementioned "driving engagement" of the drive gear with the different ones of the blind rollers.

Therefore, in one embodiment of the drive assembly, the exertion of a rotational force and substantially concurrent rotation of the drive gear, by exerting a pulling force on the pull chain connected to the drive gear, will cause the driving component associated with the drive gear to extend outwardly therefrom into the driving orientation. Once in the driving orientation, the driving component will be disposed within the interior of the socket and/or female configured driven component of an aligned one of the plurality of blind rollers. Upon positioning of the blind associated with the driven blind roller in a preferred raised or lowered orientation, a user will release the pull chain resulting in the removal of the rotational force and stopping of the rotation of the corresponding blind roller. In turn, this will result in an "automatic" disposition of the driving component into its retracted and/or nondriving orientation. When the driving component is so positioned, the carriage may then be moved into alignment with a different blind roller by manipulation of the dial or selector member in order to raise or lower a different blind roller and corresponding blind or shade as desired.

As explained in greater detail hereinafter the operative and structural features of the drive assembly of the present invention is thereby believed to overcome the disadvantages and problems associated with multi-blind assemblies and their operation recognized in conventional and prior art blind assemblies.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 3:
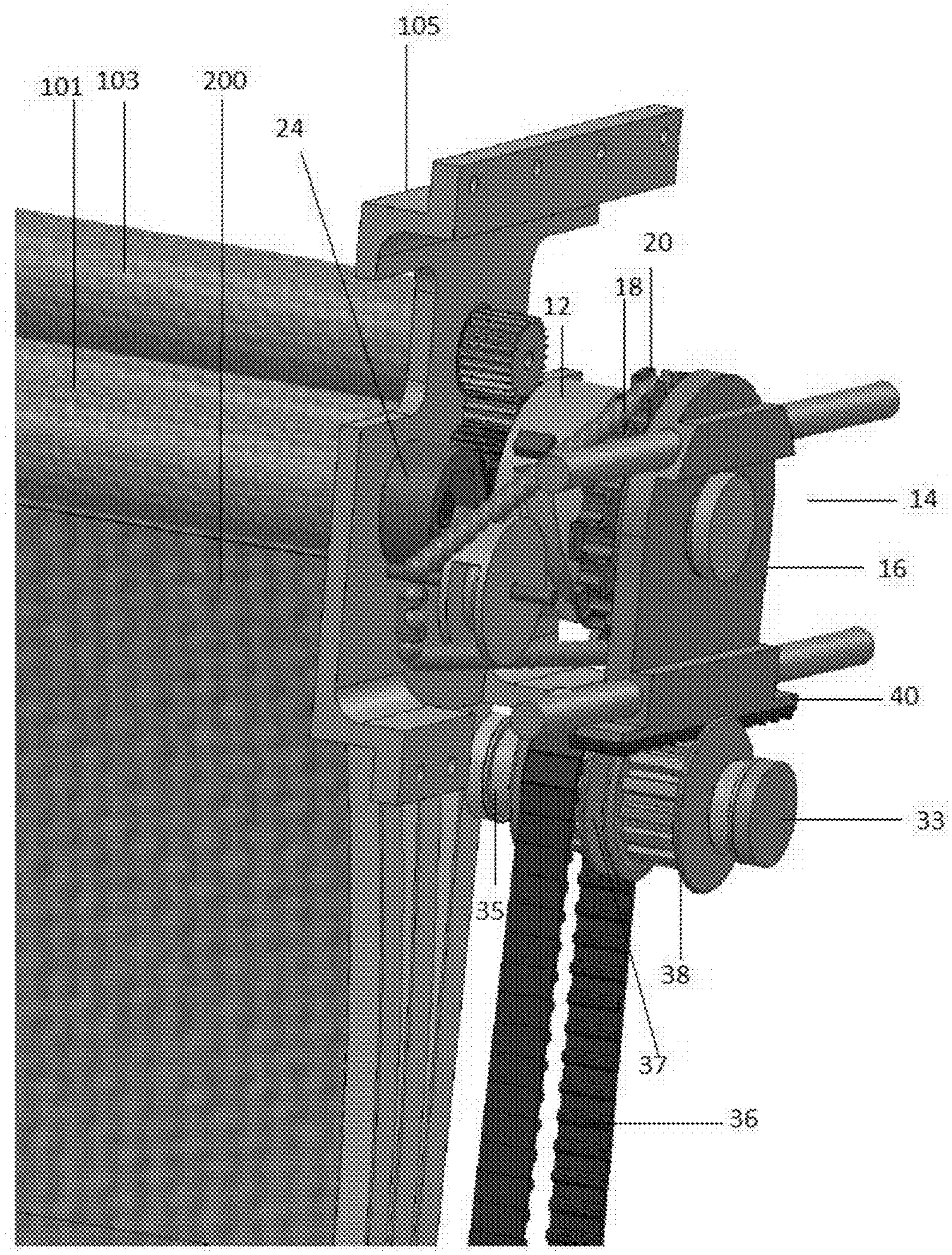
FIG. 3 is a front perspective view in detail and partial cutaway of the drive assembly of the embodiments of FIGS. 1 and 2

The present invention is directed to a drive assembly, generally indicated as 10, operatively associated with a vertical blind assembly 100 of the type having multiple blinds or shades 200. The blinds or shades 200 may comprise flexible material panels, which may be wound around and independently connected to different ones of a plurality of blind rollers 101 and 102. The vertical blind assembly of this type may be commonly or conventionally referred to as a roller blind or roller shade. As such rotation of the blind rollers 101 and 102 in one of two opposite directions will cause the raising or lowering of the panels 200. Such a roller type shade or blind material may be distinguishable from a blind or shade being formed from a plurality of spaced apart and relatively movable slats. As represented in at least FIGS. 3 and 4, a support or mounting bracket 105 is provided for securement of the blind rollers 101 and 102 in their operative position along with a supplementary roller 103.

The drive assembly 10 of the present invention includes a drive gear 12 cooperatively structured with the remaining components of the drive assembly 10 to be selectively positioned in spaced but aligned driving relation with each of the plurality of blind rollers 101 and 102. Such selective and independent positioning of the drive gear 12 is facilitated by the inclusion of a support assembly generally indicated as 14, movable with and connected in supporting relation to the drive gear 12 as it moves between the plurality of blind rollers 101 and 102, into the aforementioned driving relation with different ones of the blind rollers 101 and 102. It is emphasized that in the accompanying Figures, the blind assembly 100 is represented as including two blind rollers 101 and 102 each rotationally or movably connected to a different shade 200. However, the operative and structural features of the blind assembly 100 may be associated with a greater number of blind rollers and shades other than the two represented.

In at least one embodiment, the support assembly 14 comprises a carriage 16 on which the drive gear 12 is rotationally mounted and with which it is movable. The carriage 16, along with the drive gear 12, is movable relative to and between the plurality of blind rollers 101 and 102. Moreover, the operative and structural features of the carriage assembly 16 enable a selective positioning of the drive gear 12 in the aforementioned spaced and aligned driving relation to each of the blind rollers 101 and 102 independently of one another. When in the driving relation to a selected one of the plurality of blind rollers 101 and 102, the drive gear 12 may be subsequently and selectively disposed into a driving engagement with the corresponding and/or aligned one of the blind rollers 101 or 102. Such a driving engagement of the drive gear 12 with the correspondingly aligned blind roller 101 or 102 is accomplished by exerting a rotational force and a substantially concurrent forced rotation of the drive gear 12.

Such forced or driving rotation of the drive gear 12 will in turn cause a forced an intended rotation of the blind roller 101 or 102 to which it is drivingly engaged. It should be of note that the drive gear 12, once in the aforementioned driving engagement with one of the plurality of blind rollers 101 and 102 may be rotated in opposite directions which in turn will cause a raising or a lowering of the blind 200 associated with the engaged blind roller 101 or 102. The exertion of a rotational force and the substantially concurrent rotation of the drive gear 12 is accomplished by interconnecting a pull chain 18 or like structure in rotationally driving relation to the drive gear 12. Such driving interconnection between the pull chain 18 and the drive gear 12 may be by a gear segment 26 fixedly connected to and considered a part of the drive gear 12. Therefore, an individual exerting a pulling force in either of two opposite directions on the pull chain 18 will result in a rotation of the drive gear 12, via the gear segment 20.

Moreover, the drive gear 12 includes a driving component 22 rotational with the drive gear and movable with the drive gear 12, on the carriage 16. The exertion of a pulling force on the pull chain 18 will result in engagement of the driving component 22 with and rotation of the drivingly engaged blind roller 101 or 102. Depending upon the direction of rotation of the drive gear 12 and driving component 22, the blind 200 on the drivingly engaged roller 101 or 102 causes a raising or lowering of the blind 200.

Therefore, one embodiment of the drive assembly 10 is operative to distinguish disposition of the drive gear into a spaced and aligned "driving relation" with the different ones of the blind rollers 101 and 102 and a "driving engagement" therebetween. The "driving relation" of the drive gear 12 relative to a selected one of the plurality of blind rollers 101 and 102 is accomplished by a selected movement and positioning of the carriage 16 of the support assembly 14 into a predetermined position. The predetermined position of the drive gear 12 will dispose it and the driving component 22 in aligned but spaced relation to a driven component 24 connected to and rotational with the selected blind rollers 101 or 102. In contrast, the term "driving engagement" may be defined by the driving component 22 of the drive gear disposed in direct engagement with the aforementioned driven component 24 associated with the aligned blind roller 101 or 102. As indicated and explained in greater detail hereinafter, one embodiment of the drive assembly 10 comprises the aforementioned driving component 22 of the drive gear 24 being disposed into "driving engagement" with a corresponding or aligned one of the blind rollers 101 or 102 by exerting a rotational force on and a substantially concurrent rotation of the drive gear 12 and the included driving component 22.

In order to facilitate convenient, reliable and efficient operation in selecting the raising or lowering of individual ones of the blinds, via rotational activation of corresponding ones of the blind rollers 101 and 102, the drive assembly 10 of the present invention further comprises a selector assembly, generally indicated as 30. As utilized, the selector assembly 30 is connected in driving relation to the aforementioned support assembly 14 and carriage 16. The selector assembly 30 is thereby operative to selectively dispose the drive gear 12 into the driving relation, selectively with different ones of the blind rollers 101 or 102, through movement or travel of the carriage 16 between and into alignment with the different blind rollers 101 and 102.

Figure 1:
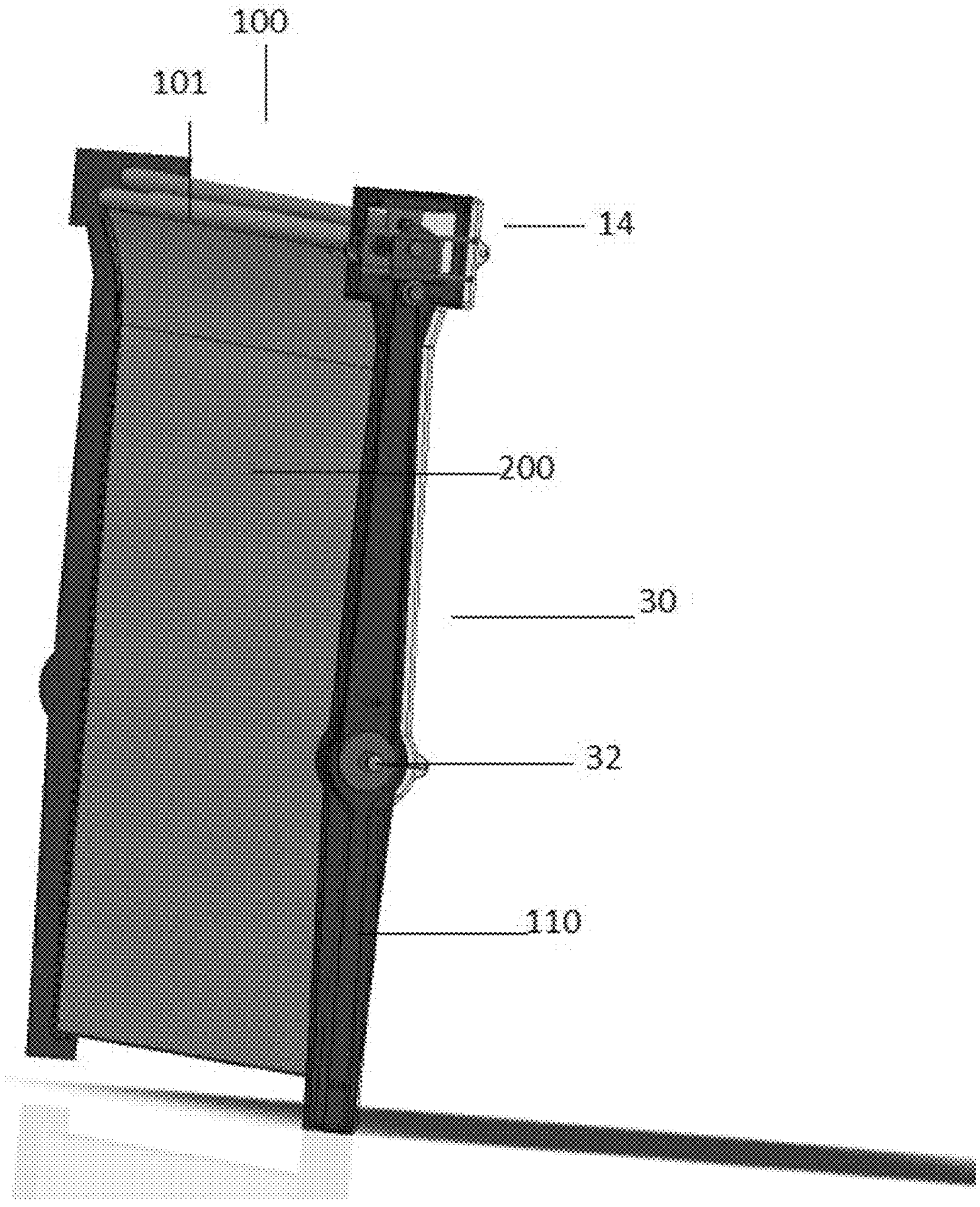
FIG. 1 is a front perspective view of a vertical blind assembly and included drive assembly of the present invention.
Figure 2:
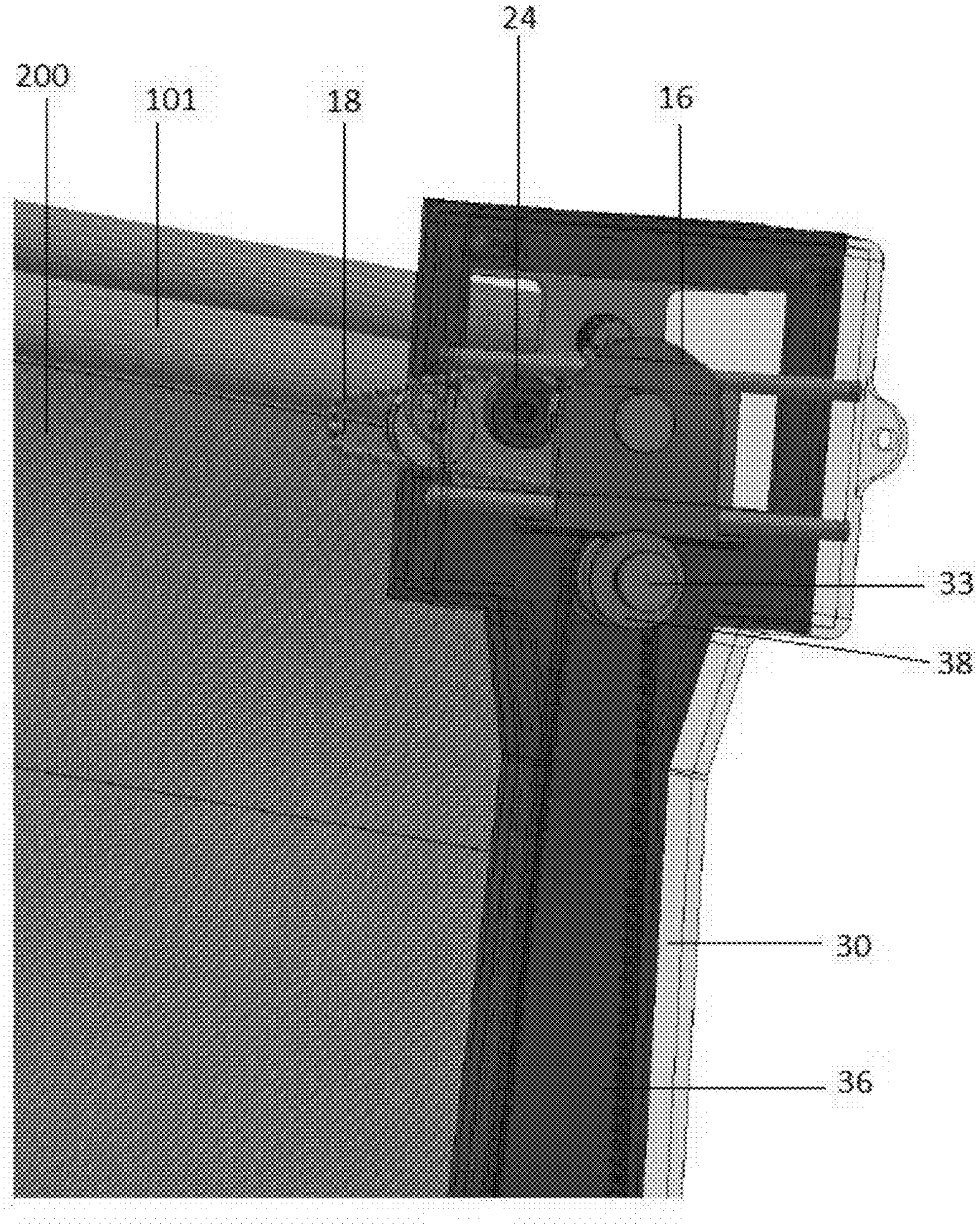
FIG. 2 is a perspective view in partial cutaway of the drive assembly as represented in the embodiment of FIG. 1.
Figure 4:
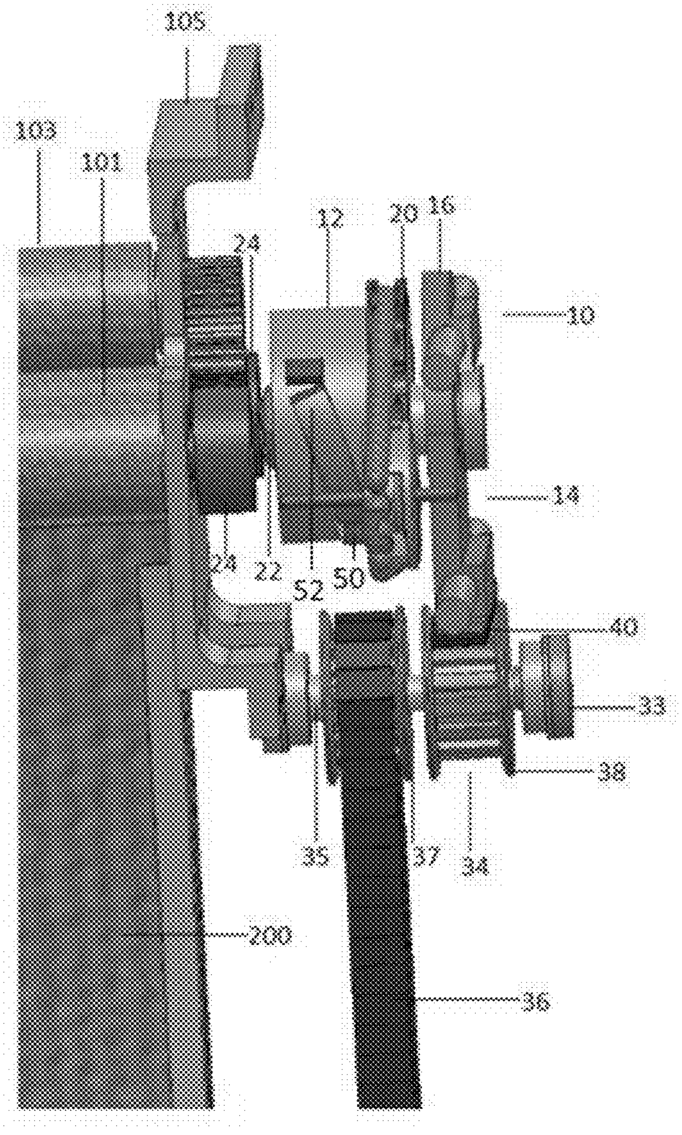
FIG. 4 is a side perspective view in detail and partial cutaway of the embodiment of FIG. 3.

In more specific terms, the selector assembly 30 includes at least one selector member 32 mounted on or connected to a frame 110 of vertical blind assembly 100 or other supporting structure in a readily accessible location, such as represented in FIG. 1. As such, the selector member 32 may be in the form of a dial, knob or other structure capable of being manually manipulated, or otherwise manipulated by a power control mechanism. The selector member 32 is thereby disposed and structured to facilitate the selection of the roller blind 101 or 102 and blind or shade 200 rotationally secured thereto to be raised or lowered. Further, the selector assembly 30 includes mechanical linkage, generally represented as 34, in at least FIGS. 3 and 4. The mechanical linkage 34 serves to operatively interconnect the dial or other selector member 32 to the carriage 16 of the support assembly 14. Therefore, when manipulated, the selective positioning of the selector member 32 will activate the aforementioned mechanical linkage 34, which in turn will move and/or drive the carriage 16, as well as the drive gear 12 mounted thereon, into the aforementioned spaced and aligned "driving relation" to a preferred and/or selected one of the drive rollers 101 or 102. Once so positioned, the exertion of a rotational force on the drive gear 12, by the pull chain 18, will result in a disposition of the driving component 22 of the drive gear 12 into the aforementioned "driving engagement", as represented in FIG. 4, with a driven component 24 fixedly attached to and rotatable with a corresponding one of the blind rollers 101 or 102.

Further by way of example, the aforementioned drive linkage 34 associated with the selector assembly 30 may include a drive belt 36 interconnecting the selector member 32 to a driven belt gear 37 which in turn may be interconnected to the carriage 16 by a pinion gear 38 and rack gear 40. As emphasized, the term "drive belt" is meant to include different types of elongated flexible structures, preferably having a closed or continuous configuration and is not limited to a "belt" type structure as represented throughout the Figures. The operative positioning of the drive belt 36 will result in a turning of the belt gear 37 based on a rotation or other intended manipulation of the dial member 32 or other type selector member. In addition, the mechanical drive linkage 34 associated with selector assembly 30 may also include rack and pinion gear structure comprising pinion gear 38 disposed in rotationally driving relation to the aforementioned rack gear 40. As represented throughout the Figures, the belt gear 37 is driven by the belt 36 which in turn drives a rotational shaft 35 fixedly connected to both the belt gear 37 and the belt gear in the pinion gear 38.

Therefore, rotation of the belt gear 37 causes rotation of the pinion gear 38 via the rotational shaft 35. The pinion gear 38 is in turn disposed in driving relation to the rack gear 40 which is fixedly secured to the carriage 16. In turn, a driving of the rack gear 40 by rotation of the pinion gear 38 will cause a linear movement or displacement of the carriage 16, as well as the drive gear 12 mounted thereon, into the aforementioned aligned "driving relation" of the drive gear 12 and the driving component 22, with the driven component 24 connected to and rotational with an intended or selected one of the blind rollers 101 or 102. As indicated and clearly demonstrated throughout the Figures, movement of the dial or selector member 32 to select one of the blind rollers 101 or 102 to be activated, will result in the aforementioned mechanical linkage 34 linearly moving and positioning the carriage 16 and the drive gear 12 into a predetermined orientation, which in turn will result in an aligned "driving relation" of the drive gear 12 and the driving component 22, relative to the driven component 24 of a selected one of the plurality of blind rollers 101 or 102.

As an alternative to disposing the carriage 16 in a preferred position relative to the blind rollers 101 and 102, utilizing the selector member 32 (see FIG. 1), a secondary dial or knob 33 may be manually manipulated. Such manipulation will cause a rotation of the pinion gear 38 and a linear movement of the carriage 16, by virtue of the pinion 38 engaging the rack gear 40.

Other features of the drive assembly 10 which facilitate an efficient selective and independent raising or lowering of each of the plurality of blinds 200 through a driving rotation of corresponding ones of the plurality of blind rollers 101 and 102 includes the cooperative structuring between the aforementioned driving component 22 associated with the drive gear 12 and the plurality of driven components 24 each fixedly secured to and rotational with different ones of the plurality of blind rollers 101 and 102.

Figure 5:
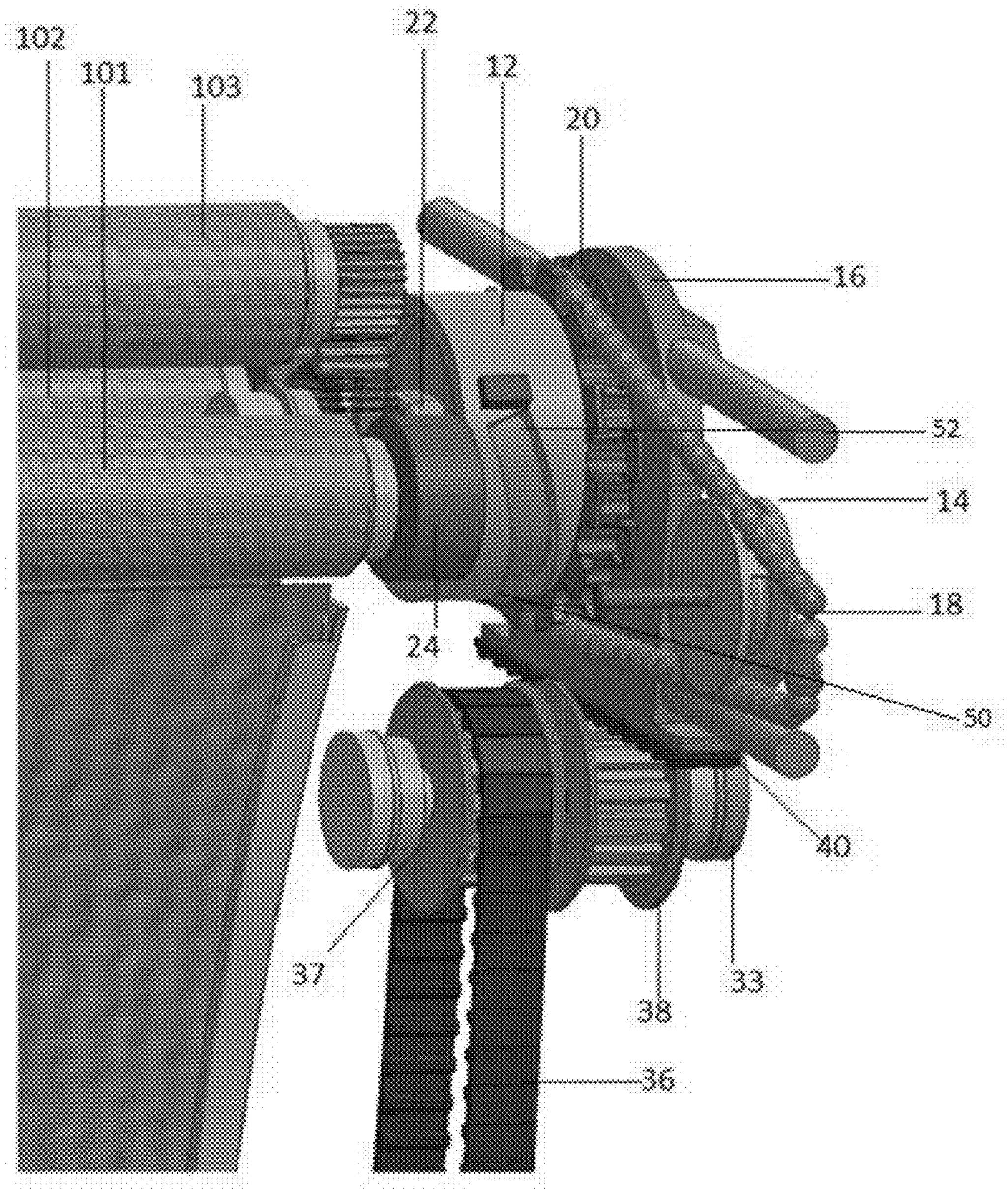
FIG. 5 is a rear perspective view in detail and partial cutaway of the embodiment of FIGS. 2-4.

More specifically, the driving component 22 is movable with the drive gear on and relative to the supporting carriage 16 and is also movable relative to the drive gear 12 between a driving orientation (see FIG. 4) and a nondriving orientation (see FIG. 5). In at least one embodiment of the drive assembly 10, the driving component 22 includes a finger, stub, tongue or like structure having at least a minimal elongated and substantially male configuration. As set forth in greater detail hereinafter, structural members, which may be at least partially integrated into the housing or body of the drive gear 12, are operative to dispose the driving member 22 into and between the aforementioned driving orientation and nondriving orientation. In the nondriving orientation, the driving component may be at least partially retracted into the interior of the housing or base of the drive gear 12 and out of the driving engagement with the driven component 24 associated with each of the plurality of blind rollers 101 and 102. In contrast, once the aforementioned rotational force and/or substantially concurrent rotation of the drive gear 12 occurs, such as by pulling the pull chain 18, the driving component 22 will be forced to extend outwardly from the housing, base or exposed inner surface of the drive gear 12 into the driving orientation and into the aforementioned "driving engagement" with a correspondingly positioned and/or aligned one of the driven components 24 of a corresponding blind roller 101 or 102, as represented in FIG. 4.

Moreover, the positioning mechanisms associated with the disposition of the driving component between the outwardly extending driving orientation and the retracted, nondriving orientation is also operative to maintain and/or bias the driving component 22 into the retracted, nondriving orientation (see FIG. 5) after the exertion of a rotational force and resulting rotation of the drive gear 12 has stopped. Accordingly, during the retracted, nondriving orientation of the driving component 22 the carriage 16 may be freely positioned into the aligned driving relation with different ones of the blind rollers 101 and 102 through manipulation of the dial or selector member 32.

Figure 6:
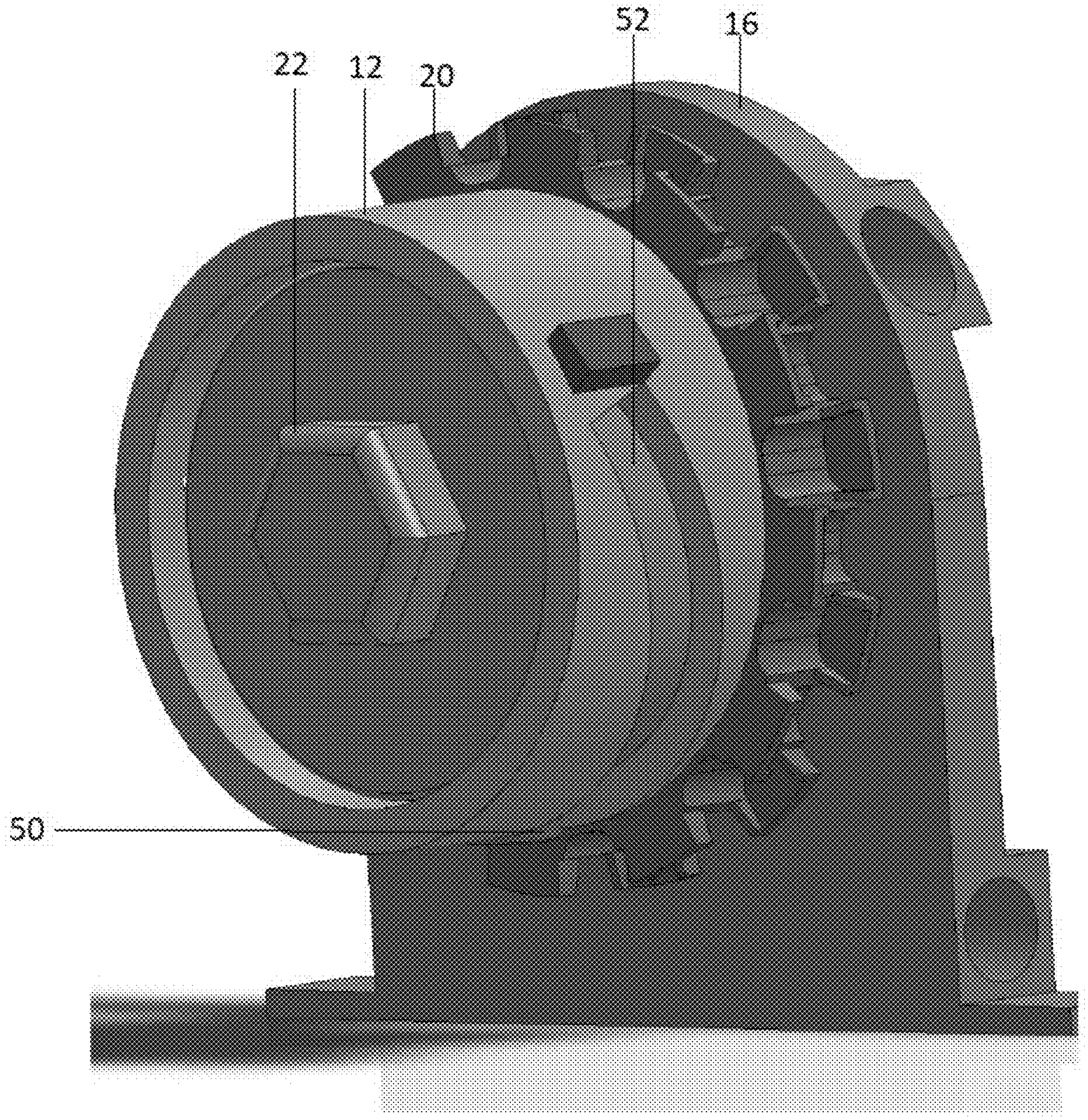
FIG. 6 is a perspective detail view of a positioning mechanism associated with the embodiment of FIGS. 1-5.

As represented in at least FIGS. 4, 5 and 6 one embodiment of the aforementioned positioning mechanism is disposed at least partially within the interior of the base or housing of the drive gear 12. In more specific terms, one embodiment of the positioning mechanism may include a pin or like member 50 extending partially exteriorly of the drive gear 12 and movable relative thereto within a channel 52, as the drive gear 12 is forced to rotate. Cooperative structural linkage (not shown) within the interior of the drive gear 12 is connected to the pin 50 and is structured to dispose the driving component 22 between the driving orientation, as represented in FIG. 4, and the nondriving orientation, as at least partially represented in FIG. 5. Therefore, rotation of the drive gear 12 in either opposite direction, in order to raise or lower one of the blind panels 200, will cause the pin 50 to travel to a different one of the opposite ends of the channel 52. Upon reaching either opposite end of the channel 52, the pin 50 and cooperative structural linkage on the interior of the drive gear 12 will be operative to dispose the driving component 22 outwardly from the drive gear 12 into the aforementioned driving orientation. However, associated with the interior structural linkage is a biasing mechanism or other appropriate structure which will effectively release the pin 50 causing it to return to a midpoint of the channel 52, which in turn will result in the driving component 22 being "automatically" disposed in the non-driving orientation, upon the pull chain 18 being released by a user. Therefore, once a rotational force ceases to be exerted on the drive gear 12 and/or the drive gear 12 stops rotating, the internal structural linkage within the drive gear 12 will be operative to return the pin 52 the "neutral" position in spaced relation to both of the opposite ends of the channel 52, which in turn will result in a retraction or automatic positioning of the pin 50 in the aforementioned nondriving orientation.

As previously emphasized, disposition of the driving component 22 in the nondriving orientation allows the selective linear movement or travel of the carriage 16 and the drive gear 12 attached thereto, into an engaging relation with a different one of the blind rollers 101 or 102.

As stated herein, each of the blind rollers 101 and 102 includes the driven component 24 fixedly connected thereto and rotational there with. In at least one preferred embodiment each of the driven components 24 are secured to an end of a different one of the plurality of blind rollers 101 and 102, which is substantially adjacent to and in communication with the carriage 16, drive gear 12 and driving component 22. In at least one embodiment of the drive assembly 10, each of the driven components 24 have a socket and/or female configuration dimensioned and configured to receive the male configured driving component 22 of the drive gear 24 therein to define the aforementioned "driving engagement" of the drive gear 12 with the different ones of the blind rollers 101 and 102.

Therefore, in one embodiment of the drive assembly 10 the exertion of a rotational force and substantially concurrent rotation of the drive gear 12 by exerting a pulling force on the pull chain 18 connected to the drive gear 12 will cause the driving component 22 associated there with to extend outwardly therefrom into the driving orientation and into the interior of the socket and/or female configured driven component 24 of one of the plurality of blind rollers 101 or 102 disposed in the aligned driving relation to the drive gear 12. Upon positioning of the blind 200 associated with the driven blind roller 101 or 102 in a preferred orientation (raised or lowered), a user will release the pull chain 18 resulting in the removal of the rotational force and a stopping of the rotation of the corresponding blind roller 12. In turn, this will result in an "automatic" disposition of the driving component 22 into its retracted and/or nondriving orientation. When the driving component 22 is so positioned, the selector member 32 may then be manipulated to linearly move or position the carriage 16 such that the drive gear 12 is disposed in aligned engaging relation to a different one of the blind rollers 101 or 102. This will allow and activation of a different blind roller 101 or 102 and corresponding blind or shade 200 for the activation thereof (raising or lowering) as desired and intended.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A drive assembly for a vertical blind assembly comprising a plurality of blind rollers, the drive assembly configured to rotate each of the plurality of blind rollers, said drive assembly comprising:

a drive gear selectively positioned into driving relation with different ones of the plurality of blind rollers, said drive gear including a driving component disposable into rotationally driving engagement with a different one of the plurality of blind rollers, concurrent to rotation of said drive gear, said driving component movable with and relative to a portion of said drive gear; said driving component disposed between a driving orientation and a nondriving orientation, dependent on a concurrent rotation of said drive gear, a support assembly movable with and supporting said drive gear into said driving relation to different ones of the plurality of blind rollers, and a selector assembly connected in driving relation to said support assembly and operative to selectively dispose said drive gear into said driving relation with different ones of the plurality of blind rollers.

2. The drive assembly as recited in claim 1 wherein said support assembly comprises a carriage; said drive gear rotationally mounted on and movable with said carriage into said driving relation with different ones of the plurality of blind rollers.

3. The drive assembly as recited in claim 2 wherein said selector assembly comprises a selector member operable and determinative of disposition of said carriage and said drive gear into said driving relation with different ones of the plurality of blind rollers.

4. The drive assembly as recited in claim 3 wherein said selector assembly comprises a mechanical linkage interconnecting said selector member into driving relation with said carriage.

5. The drive assembly as recited in claim 4 wherein said mechanical linkage comprises a rack and pinion gear structure disposed and structured to linearly position said carriage and said drive gear assembly between different ones of the plurality of blind rollers.

6. The drive assembly as recited in claim 4 wherein said mechanical linkage comprises a belt drivingly interconnecting said selector member to said carriage.

7. The drive assembly as recited in claim 1 wherein said driving component is disposed in said driving orientation concurrent to rotation of said drive gear in either opposite direction.

8. The drive assembly as recited in claim 1 wherein said driving component is normally biased in said nondriving orientation, concurrent to non-rotation of said drive gear.

9. The drive assembly as recited in claim 1 further comprising a plurality of driven components each fixedly connected to and rotational with a different one of the plurality of drive rollers.

10. The drive assembly as recited in claim 9 wherein each of said driven components is cooperatively structured with said driving component, to establish driving engagement therebetween, concurrent to rotation of said drive gear.

11. The drive assembly as recited in claim 9 wherein each of said driven components comprises a socket structure, including a female configuration, cooperatively structured to receive said driving component in said driving engagement therein.

12. The drive assembly as recited in claim 11 wherein said driving component comprises a male configuration dimensioned and configured to be independently received within any of said socket structures in said driving engagement.

13. The drive assembly as recited in claim 12 further comprising a pull cord drivingly connected to each of the plurality of drive rollers; a rotational force exerted on said drive gear via manipulation of said pull cord.

14. The drive assembly as recited in claim 1 wherein said support assembly comprises a carriage; said drive gear rotationally mounted on and movable with said carriage between different ones of the plurality blind rollers and into said driving relation with an aligned one of the plurality of blind rollers.

15. The drive assembly as recited in claim 14 wherein said driving component is disposed into said non-driving orientation, concurrent to movement of said carriage between different ones of the plurality of blind rollers.

16. The drive assembly as recited in claim 15 wherein said driving component is disposed into said driving orientation with an aligned one of the plurality of blind rollers, concurrent to said appropriately directed rotational force being exerted on said drive gear.

17. A drive assembly for a vertical blind assembly comprising a plurality of blind rollers, the drive assembly configured to rotate each of the plurality of blind rollers, said drive assembly comprising:

a drive gear selectively positioned into driving relation with different ones of the plurality of blind rollers, said drive gear including a driving component disposable into rotationally driving engagement with a different one of the plurality of blind rollers, concurrent to rotation of said drive gear, a support assembly movable with and supporting said drive gear into said driving relation to different ones of the plurality of blind rollers, a selector assembly connected in driving relation to said support assembly and operative to selectively dispose said drive gear into said driving relation with different ones of the plurality of blind rollers, and said selector assembly comprises a selector member and mechanical linkage operable to dispose said carriage and said drive gear into said driving relation with different ones of the plurality of blind rollers; said mechanical linkage comprises a belt drivingly interconnecting said selector member to said support assembly.

18. A drive assembly for a vertical blind assembly comprising a plurality of blind rollers, the drive assembly configured to rotate each of the plurality of blind rollers, said drive assembly comprising:

a drive gear selectively positioned into driving relation with different ones of the plurality of blind rollers, said drive gear including a driving component disposable into rotationally driving engagement with a different one of the plurality of blind rollers, concurrent to rotation of said drive gear, a support assembly movable with and supporting said drive gear into said driving relation to different ones of the plurality of blind rollers, a selector assembly connected in driving relation to said support assembly and operative to selectively dispose said drive gear into said driving relation with different ones of the plurality of blind rollers, said support assembly comprising a carriage; said drive gear rotationally mounted on and movable with said carriage into said driving relation with different ones of the plurality of blind rollers, said selector assembly comprising a selector member operable and determinative of disposition of said carriage and said drive gear into said driving relation with different ones of the plurality of blind rollers, said selector assembly comprising a mechanical linkage interconnecting said selector member into driving relation with said carriage, and said mechanical linkage comprises a rack and pinion gear structure disposed and structured to linearly position said carriage and said drive gear between different ones of the plurality of blind rollers.

* * * * *